N. ROBINSON.
Plow.
No. 94,841.            Patented Sept. 14, 1869.
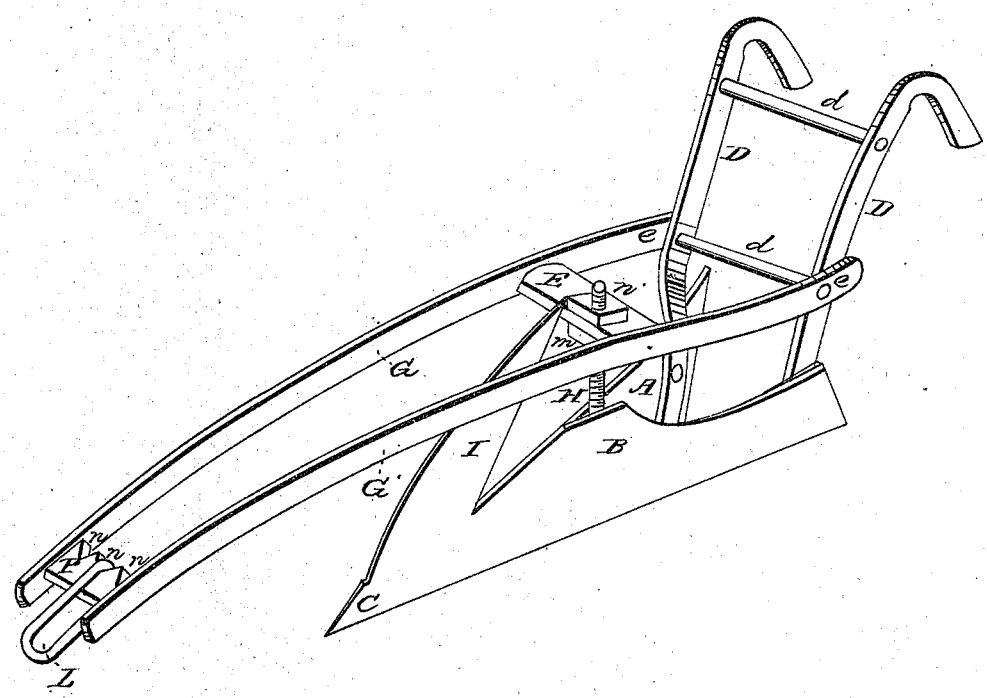

UNITED STATES PATENT OFFICE.

NATHANIEL ROBINSON, OF PATCHOGUE, NEW YORK.

IMPROVEMENT IN PLOWS.

Specification forming part of Letters Patent No. 94,841, dated September 14, 1869.

*To all whom it may concern:*

Be it known that I, NATHANIEL ROBINSON, of Patchogue, in the county of Suffolk and State of New York, have invented a new and Improved Plow; and I do hereby declare that the following is a full, clear, and exact description of the construction and operation of the same, reference being had to the accompanying drawing, making a part of this specification, in which my invention is represented by a perspective view.

The object of this invention is to prevent the plow from choking when plowing in stubble, manure, &c. The object is accomplished by the employment of a double beam, and a sharp colter rising above the beam, as hereinafter set forth.

In the drawing, A is the mold-board; B, the landside; C, the share; D D, the handles, respectively attached to the mold-board and landside; d d, rounds, connecting the handles; G G', the double beam, consisting of two parts, G and G', connected together by the cross-pieces E and F, and attached to the handles at e e; H, a vertical screw-standard running from the lower part of the landside through the cross-piece E, and, by means of screw-nuts m m', serving to adjust the position of the beam with relation to the plow, so as to regulate the draft at pleasure; and I, an inclined colter extending from the share upward and backward to a point above the plow-beam, and midway between its two parts, G G'.

The cross-piece F may be provided with a series of holes or notches, n n, by which the link L can be adjusted laterally at pleasure, whereby the services of a clevis are dispensed with.

It is evident that with this improved form of plow there can be no clogging with stubble, grass, weeds, &c., however the ground may be cumbered with such materials.

Having thus described my invention, what I claim as new, and desire to secure by Letters Patent, is—

1. The arrangement of the double beam G G and colter I, substantially as and for the purposes specified.

2. In connection with the double beam G G', cross-bar E, and plow A B C, the vertical screw-standard H and adjusting-nuts m m', constructed to operate substantially as and for the purposes specified.

To the above specification of my improvement I have set my hand this 6th day of April, 1869.

N. ROBINSON.

Witnesses:
    DAVIS CONKLING,
    DANIEL G. ROBINSON.